(12) United States Patent
Ando et al.

(10) Patent No.: US 7,842,117 B2
(45) Date of Patent: Nov. 30, 2010

(54) HOLDING SEALER, EXHAUST GAS PROCESSING DEVICE AND MANUFACTURING METHOD OF THE SAME

(75) Inventors: Hisashi Ando, Takahama (JP); Tatsunari Yanagisawa, Takahama (JP)

(73) Assignee: Ibiden Co., Ltd., Ogaki-Shi (JP)

( * ) Notice: Subject to any disclaimer, the term of this patent is extended or adjusted under 35 U.S.C. 154(b) by 0 days.

(21) Appl. No.: 11/760,160

(22) Filed: Jun. 8, 2007

(65) Prior Publication Data
US 2007/0292318 A1 Dec. 20, 2007

(30) Foreign Application Priority Data
Jun. 16, 2006 (JP) .............................. 2006-168065

(51) Int. Cl.
B01D 39/00 (2006.01)
B01D 39/06 (2006.01)
B01D 39/14 (2006.01)

(52) U.S. Cl. .............................. 55/523; 55/522; 55/524; 422/172; 422/173; 422/174; 422/175; 422/176; 422/177; 422/178; 422/179

(58) Field of Classification Search ........... 55/522–524; 422/172–179
See application file for complete search history.

(56) References Cited

U.S. PATENT DOCUMENTS

| | | | |
|---|---|---|---|
| 3,502,537 A * | 3/1970 | Pearson et al. | 442/80 |
| 5,599,509 A * | 2/1997 | Toyao et al. | 422/180 |
| 6,231,818 B1 * | 5/2001 | TenEyck | 422/179 |
| D544,090 S * | 6/2007 | Tomasiak | D23/388 |
| 2001/0051116 A1 * | 12/2001 | Hornback, III et al. | 422/179 |
| 2003/0086833 A1 * | 5/2003 | Sarsfield et al. | 422/179 |
| 2003/0091480 A1 | 5/2003 | Yamaguchi et al. | |
| 2004/0057879 A1 * | 3/2004 | Aizawa et al. | 422/179 |
| 2005/0148252 A1 * | 7/2005 | Dinwoodie et al. | 442/59 |
| 2005/0232827 A1 * | 10/2005 | Merry | 422/179 |
| 2008/0044317 A1 | 2/2008 | Kariya et al. | |
| 2008/0047638 A1 | 2/2008 | Sugino | |
| 2008/0178566 A1 | 7/2008 | Okabe | |
| 2008/0181831 A1 | 7/2008 | Okabe | |
| 2009/0049690 A1 | 2/2009 | Eguchi | |
| 2009/0072498 A1 | 3/2009 | Tanahashi et al. | |
| 2009/0075812 A1 | 3/2009 | Tanahashi et al. | |
| 2009/0081442 A1 | 3/2009 | Tanahashi et al. | |

(Continued)

FOREIGN PATENT DOCUMENTS

JP 2000-204938 7/2000

(Continued)

OTHER PUBLICATIONS

U.S. Appl. No. 12/273,947, filed Nov. 2008, Tanahashi, et al.

(Continued)

*Primary Examiner*—Walter D Griffin
*Assistant Examiner*—Amber Orlando
(74) *Attorney, Agent, or Firm*—Oblon, Spivak, McClelland, Maier & Neustadt, L.L.P.

(57) ABSTRACT

The holding sealer comprises inorganic fibers, and the holding sealer has a first surface and a second surface, wherein the first surface has ditch-shaped structures.

19 Claims, 16 Drawing Sheets

U.S. PATENT DOCUMENTS

| | | |
|---|---|---|
| 2009/0081455 A1 | 3/2009 | Mitani |
| 2009/0084268 A1 | 4/2009 | Saiki |
| 2009/0087352 A1 | 4/2009 | Okabe |
| 2009/0087353 A1 | 4/2009 | Saiki |
| 2009/0114097 A1 | 5/2009 | Saiki |

FOREIGN PATENT DOCUMENTS

| | | |
|---|---|---|
| WO | WO 99/25964 | 5/1999 |
| WO | WO 2006/020058 A1 | 2/2006 |

OTHER PUBLICATIONS

U.S. Appl. No. 12/256,630, Unknown, Goshima et al.
U.S. Appl. No. 12/240,797, Unknown, Saiki.
U.S. Appl. No. 12/327,454, Unknown, Okabe.

* cited by examiner 6.2mm 3.1mm

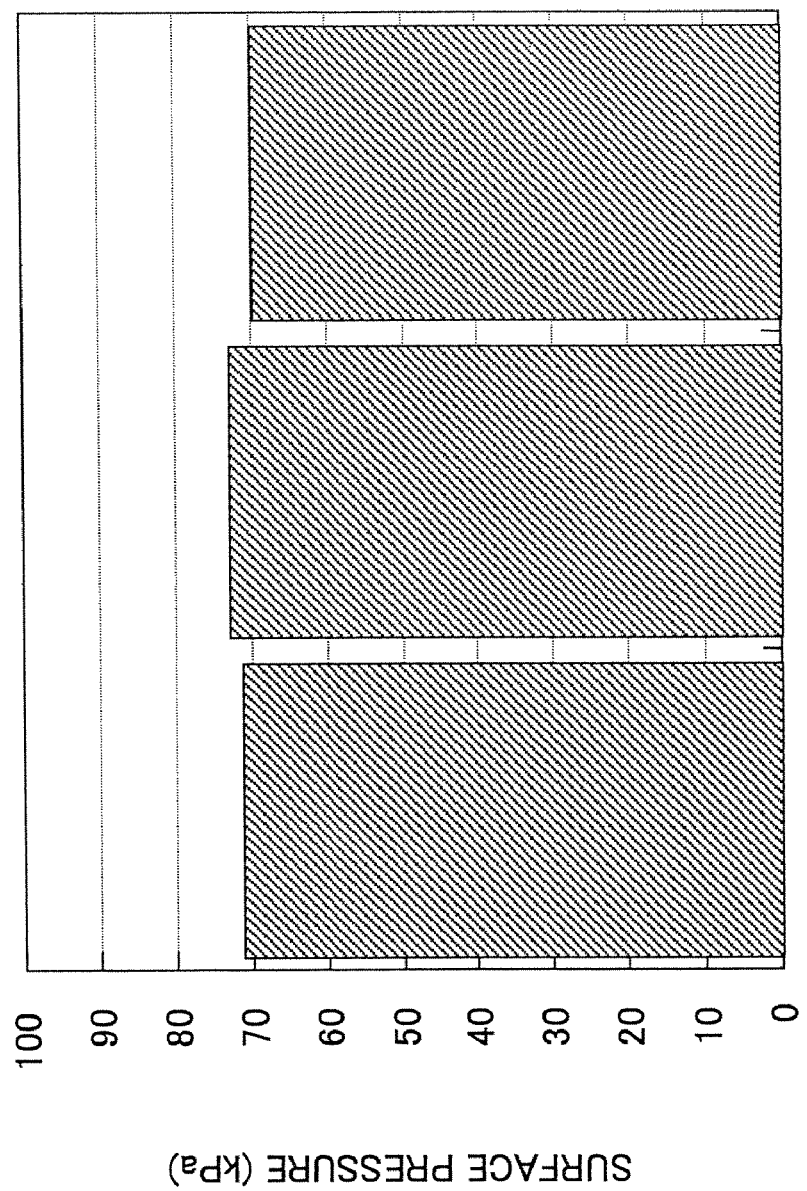

HOLDING SEALER, EXHAUST GAS PROCESSING DEVICE AND MANUFACTURING METHOD OF THE SAME

BACKGROUND OF THE INVENTION

1. Field of the Invention

This invention generally relates to a holding sealer including inorganic fibers, an exhaust gas processing device including such a holding sealer, and a manufacturing method of the same.

2. Description of the Related Art

The number of cars is greatly increasing since the beginning of this century, and the amount of exhaust gas from car engine rooms has been increasing amazingly as the number of cars has increased. Especially, various materials in the exhaust gas from diesel engines trigger environmental pollution, so that these materials are seriously influencing the global environment currently.

Under these circumstances, various exhaust gas processing devices have been suggested, and these have been used in practice. A typical exhaust gas processing device has a casing (for example, made of metal and the like) on a exhaust pipe connected to an exhaust gas manifold of the engine, in which casing an exhaust gas processing body having lots of cells, which are divided by cell walls, is arranged. Typically, these cells are constructed in a honeycomb structure. Especially in this case, the exhaust gas processing body is called a honeycomb structure body. As an example of the exhaust gas processing body, there are an exhaust gas filter such as a catalyst carrier, a diesel particulate filter (DPF), and the like. For example, in the case of the DPF, particles are trapped by cell walls during the exhaust gas passing through the exhaust gas processing body via each cell based on the above structure. Thereby particles can be removed from the exhaust gas. Materials of the exhaust gas processing body are metals, alloys, ceramics, etc. As a typical example of the exhaust gas processing body comprising ceramics, a honeycomb filter made of cordierite is known. Recently, from the viewpoint of heat resistance, mechanical strength, chemical stability, etc., a porous silundum sintered body is used as the exhaust gas processing body.

Usually, the holding sealer is placed between the above exhaust gas processing body and the casing. The holding sealer is used for protecting against breakage due to contact of the exhaust gas processing body with an inner surface of the casing during vehicle runs, and for protecting against leakage of the exhaust gas from a gap between the casing and the exhaust gas processing body. Also, the holding sealer plays an important role in preventing the exhaust gas processing body from falling off due to exhaust pressure of the exhaust gas. Moreover, the exhaust gas processing body needs to maintain high temperature for stabilizing the reaction, so that the holding sealer needs to have heat resistance. As a member satisfying these requirements, there is a sheet member including inorganic fibers such as alumina system fiber, etc.

The holding sealer is wound around at least a portion of the outer surface, except an open surface, of the exhaust gas processing body. For example, both edges of the holding sealer are engaged and the holding sealer is used by being fixed as one body with the exhaust gas processing body by means of taping. Then, the one whole body is assembled into the exhaust gas processing device by being pressed into the casing.

When the one whole body is pressed into the casing or when the exhaust gas processing device is used, surface pressure against the exhaust gas processing body exerted by the holding sealer has to be within the so-called isostatic strength in order to prevent damage to the exhaust gas processing body by compression stress from the holding sealer. Here, the isostatic strength is the compression destruction load (force) when damage occurs at the time that an isotropic resting hydraulic pressure load is applied to the exhaust gas processing body. It is defined as JASO M505-87 which is a car standard published by the Association of Corporate Car Technology.

A load that is beyond the isostatic strength is applied onto the honeycomb structure, and a method to place the holding sealer such that tab matching parts of the holding sealer are arranged facing cell walls of the honeycomb structure is suggested in order to prevent damage to the honeycomb structure at the time of combining the holding sealer wound around the honeycomb structure (see patent document 1). In the method of the patent document 1, it is disclosed that damage is unlikely to occur on the honeycomb structure because places where the surface pressure becomes high like tab matching parts of the holding sealer are arranged in a direction in which a tolerance load becomes the highest (that is, adding the surface pressure in almost perpendicular directions to cell walls) on each cell consisting of the honeycomb structure.

Patent Document 1: JP 2000-204938

SUMMARY OF THE INVENTION

There is provided according to one aspect of the present invention, a holding sealer comprising inorganic fibers, in which the holding sealer has a first surface and a second surface, wherein the first surface has ditch-shaped structures.

In the case of using the holding sealer having ditch-shaped structures, for example, when the holding sealer having ditch-shaped structures is wound around the exhaust gas processing body of the exhaust gas processing device so as to face the first surface outside, the holding sealer can be deformed so as to fill the ditch-shaped structures when the compression stress is applied onto the holding sealer. Thereby, the compression stress which is applied to the exhaust gas processing body can be scattered.

Additionally, in the holding sealer according to the present invention, the holding sealer may have plural ditch-shaped structures which are formed in parallel along with two different directions on the first surface.

Additionally, in the holding sealer according to the present invention, the ditch-shaped structures may be constructed by notch lines. In this case, the ditch-shaped structures can be formed easily.

Additionally, in the holding sealer according to the present invention, the holding sealer may be formed by a needling process.

Additionally, in the holding sealer according to the present invention, the holding sealer may include an inorganic binder and/or an organic binder. A binding force between fibers is increased, and the holding sealer is made easy to handle by adding the above binders into the holding sealer.

There is provided according to another aspect of the present invention, an exhaust gas processing device which comprises an exhaust gas processing body, a holding sealer including inorganic fibers and a casing housing the exhaust gas processing body and the holding sealer therein, wherein the holding sealer has a first surface and the holding sealer is wound around on at least a portion of an outer surface of the exhaust gas processing body such that the first surface becomes outside, and the holding sealer has ditch-shaped structures on the first surface.

Thereby, in the exhaust gas processing device of the present invention, the compression stress which is applied to the exhaust gas processing body can be scattered, and the compression stress which is directly applied onto the exhaust gas processing body is decreased by the above effect of the holding sealer. Therefore, the breakage of the exhaust gas processing body hardly occurs even though using the exhaust gas processing body having thin cell walls and low isostatic strength.

Additionally, in the exhaust gas processing device according to the present invention, the exhaust gas processing body may be a catalyst carrier or an exhaust gas filter.

Additionally, in the exhaust gas processing device according to the present invention, the exhaust gas processing body, about which the holding sealer is wound around, may be housed in the casing by any of a press-fit means, a clamshell means, a winding and tightening means and a sizing means.

Moreover, There is provided according to another aspect of the present invention, a manufacturing method of an exhaust gas processing device which comprises an exhaust gas processing body, a holding sealer including inorganic fibers and a casing housing the exhaust gas processing body and the above holding sealer therein, the manufacturing method comprising:

a step to provide the holding sealer having ditch-shaped structures on a first surface, a step in which the holding sealer is wound around on at least a portion of an outer surface of the exhaust gas processing body such that the first surface becomes outside, and a step in which the exhaust gas processing body, in which the holding sealer is wound around, is housed into the casing by any of a press-fit means, a clamshell means, a winding and tightening means and a sizing means.

BRIEF DESCRIPTION OF THE DRAWINGS

Other objects, features and advantages of the present invention will become more apparent from the following detailed description when read in conjunction with the accompanying drawings, in which:

FIG. 21 is a view showing results of examinations of a restoration surface pressure.

DESCRIPTION OF THE PREFERRED EMBODIMENTS

Next, a description is given, with reference to the accompanying drawings, of an embodiment of the present invention.

Figure 1:
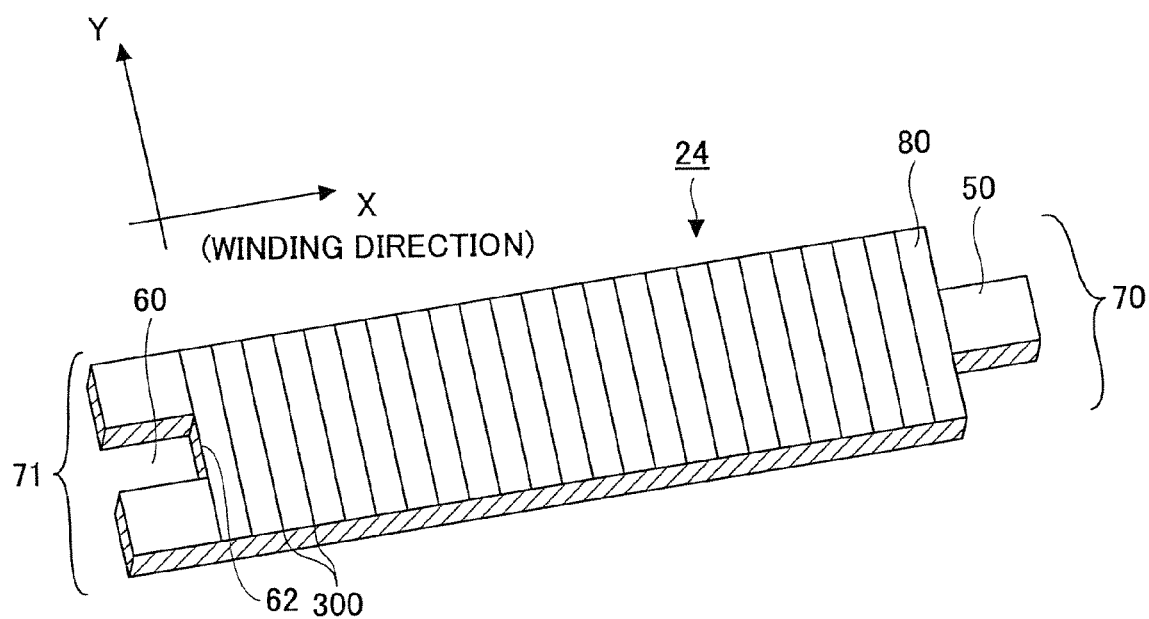
FIG. 1 is an example of a structure of the holding sealer of the present invention.
Figure 2:
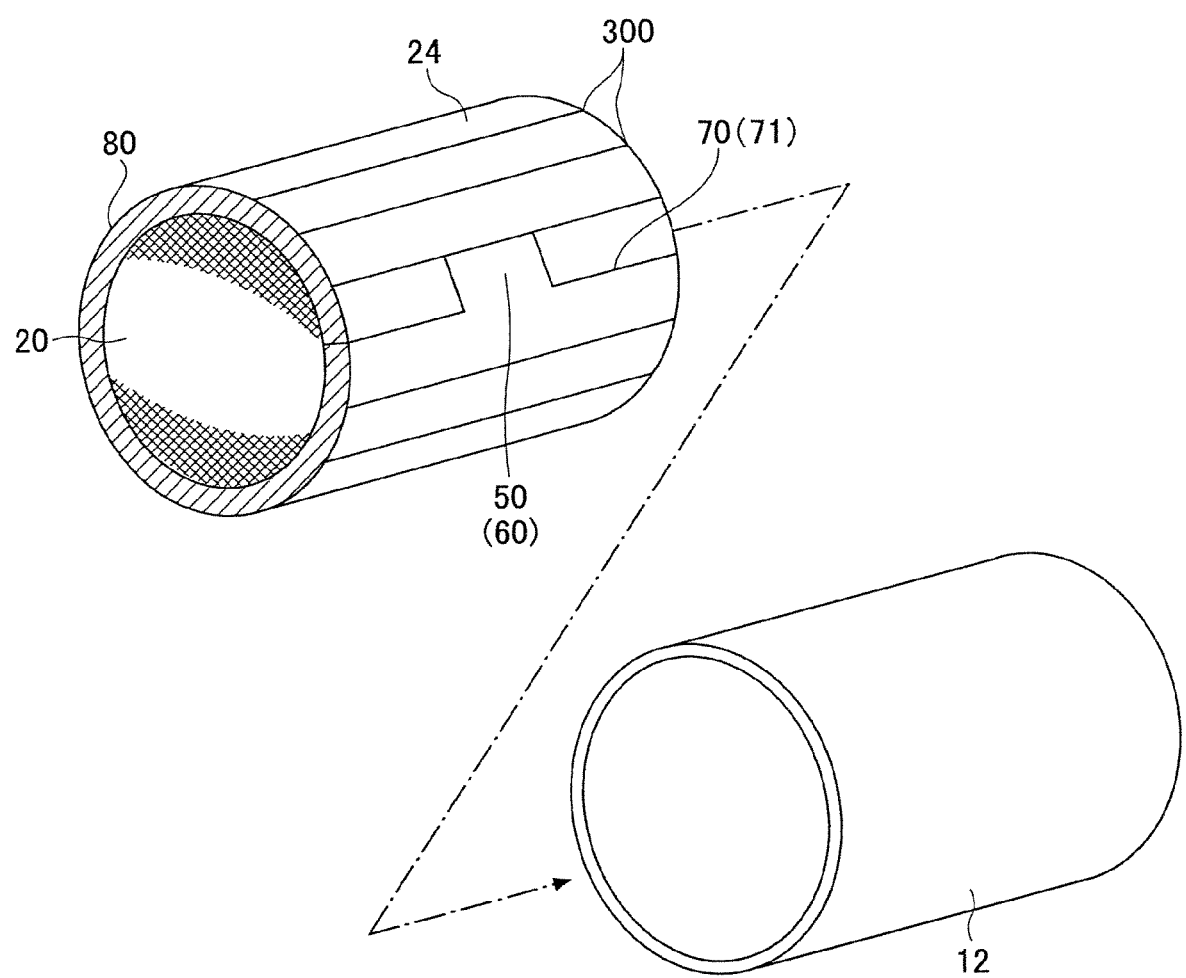
FIG. 2 is a schematic view showing a situation in which the holding sealer and the exhaust gas processing body of the present invention are incorporated into the casing.

In FIG. 1, an example of a structure of the holding sealer of an embodiment of the present invention is shown. However, the holding sealer of the present invention is not limited to the shape in FIG. 1. Also, an exploded view of the exhaust gas processing device including the holding sealer of the present embodiment is shown in FIG. 2.

As shown in FIG. 1, the holding sealer according to the present embodiment has a pair of fitting salient 50 and fitting reentrant 60 at respective edges 70, 71 which are perpendicular to the winding direction (X direction). When the holding sealer 24 is wound around the exhaust gas processing body 20 like a catalyst carrier, the fitting salient 50 and the fitting reentrant 60 are fitted together as shown in FIG. 2, then the holding sealer 24 is fixed to the exhaust gas processing body 20. Then, the exhaust gas processing body 20 around which the holding sealer 24 is wound is installed into the cylindrical casing 12 made of a metal and the like by the press-fit means, for example.

Here, in the embodiment of the present invention, the present embodiment has characteristics such that ditch-shaped structures 300 are provided on a surface (i.e. the first surface 80) of the holding sealer 24 which contacts the casing 12. When the holding sealer 24 is wound around the exhaust gas processing body 20, these ditch-shaped structures 300 are pressed into the casing 12 or at the time of use of the exhaust gas processing device, so that a compression stress which is applied to the exhaust gas processing body 20 through the holding sealer 24 can be scattered and breakage of the exhaust gas processing body 20 can be prevented.

Figure 3:
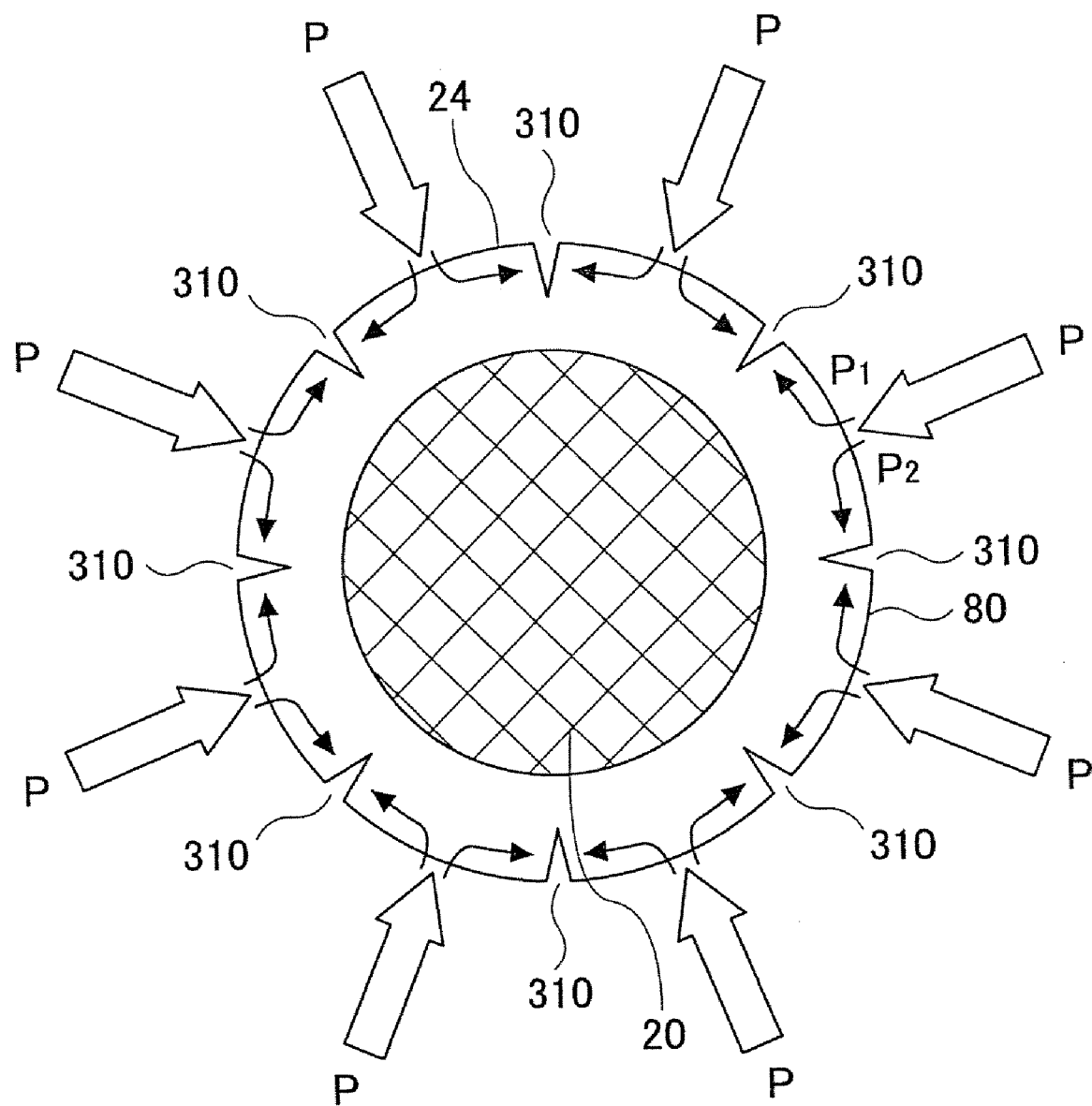
FIG. 3 is s schematic view showing a principle of the present invention.

This principle is explained by using FIG. 3. FIG. 3 is a view showing where stress is scattered due to the ditch-shaped structures 300 of the holding sealer 24. When a constant stress P is applied in the thickness direction of the holding sealer 24, the holding sealer 24 can be deformed such that spaces 310 formed as ditch-shaped structures 300 are filled. That is, the compression stress P which is applied in the thickness direction of the holding sealer 24 is absorbed partially by the deformation mechanism of the x direction (the winding direction) of the holding sealer 24. Therefore, all the load (force) of the compression stress P is not applied to the exhaust gas processing body 20 directly and the breakage of the exhaust gas processing body 20 can be prevented.

This kind of ditch-shaped structure 300 is constructed such that ditches like notches are formed on the first surface 80 of the holding sealer 24, for example. Also, in the present embodiment, the notch is a kind of ditch and it is a ditch such that both the width at the deepest position in the thickness direction of the holding sealer and the width at an open surface (i.e. the first surface) are less than 1 mm in a condition that has installed the holding sealer horizontally (that is, a condition before winding and using). Also, the ditch is not limited to the above ditch where widths at the open surface and the deepest position in the thickness direction are equal in the condition of the horizontal installation, but includes ditches having various shapes of sectional views in the thickness direction like an inverse triangle, a semicircle, a trapezoid and the like.

In addition, concerning the shape of a ditch, an elongated direction, number of ditches, pitch, dimension and the like, there is no limitation when forming ditch-shaped structures on the first surface, but any shape of ditch, in any elongated direction, any number of ditches, any pitch, any dimension and the like can be utilized.

Figure 4:
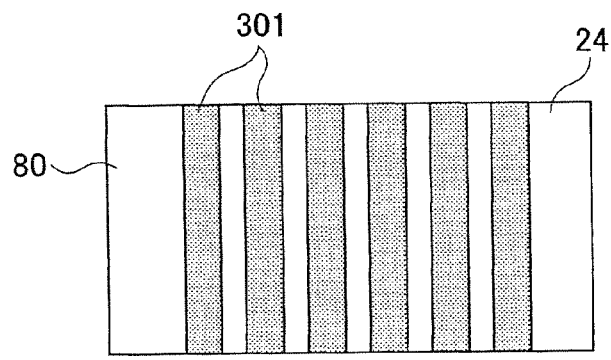
FIG. 4 is a schematic view showing an example of ditch-shaped structures of the holding sealer.
Figure 5:
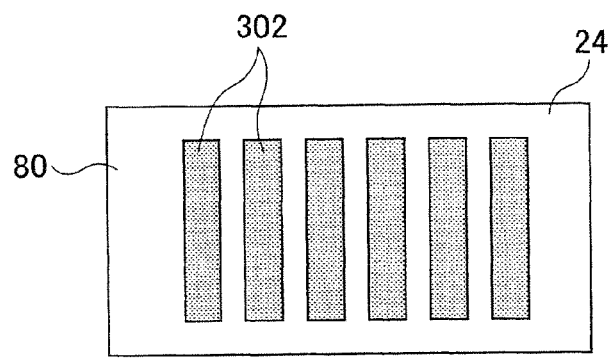
FIG. 5 is a schematic view showing other example of ditch-shaped structures of the holding sealer.
Figure 6:
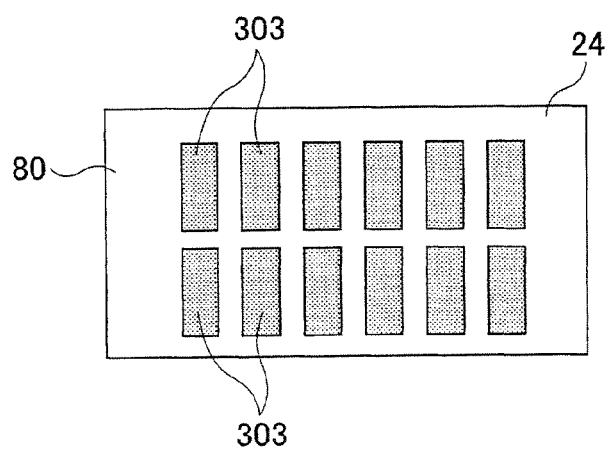
FIG. 6 is a schematic view showing further other example of ditch-shaped structures of the holding sealer.
Figure 7:
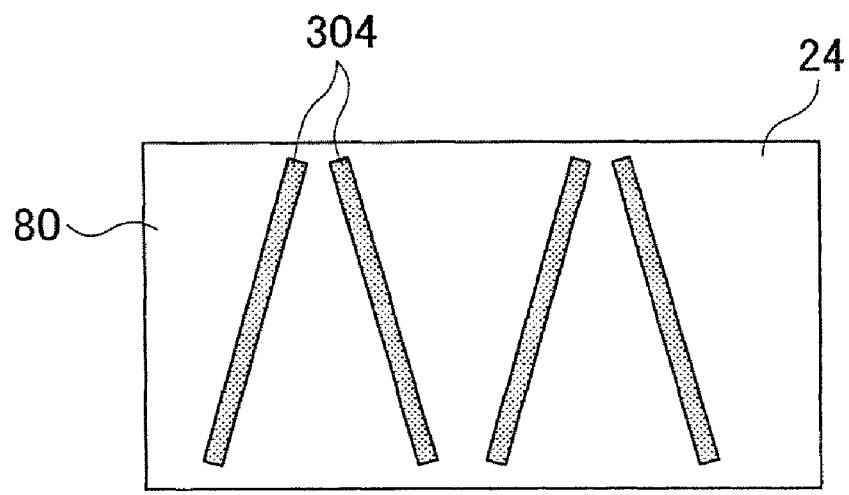
FIG. 7 is a schematic view showing a further other example of ditch-shaped structures of the holding sealer.
Figure 8:
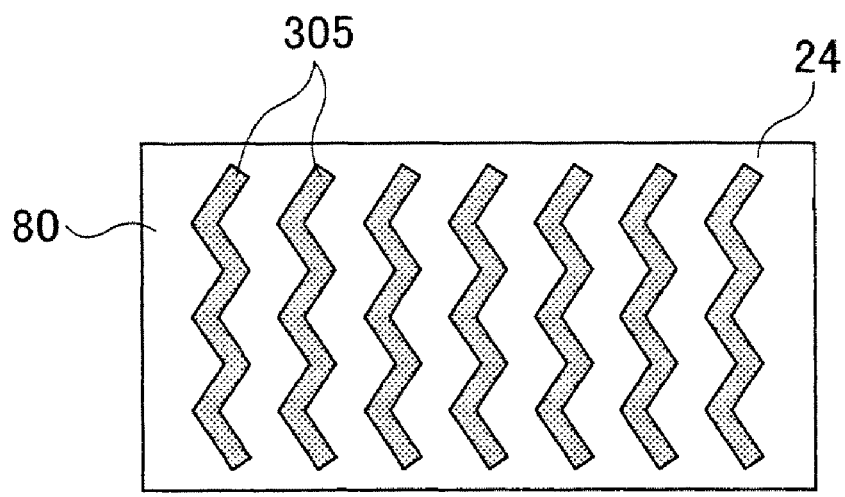
FIG. 8 is a schematic view showing a further other example of ditch-shaped structures of the holding sealer.

In FIGS. 4-8, an example of ditch-shaped structures of the holding sealer is shown. In FIG. 4, plural ditches 301 along the direction of a short side length of the holding sealer 24 are formed at equal distance on the first surface 80 of the holding sealer 24. In FIG. 5, ditches are elongated in the same direction as in FIG. 4 and plural ditches 302 which are not elongated to both ends of the holding sealer are formed at equal distances. In FIG. 6, ditches are formed such that each ditch of FIG. 5 is arranged not in a continuous one ditch but as a discontinuation ditch as plural ditches 303 having short length. In FIG. 7, ditches 304 having an angle that is slanted to the direction of the short side of the holding sealer 24 are formed. Further, in FIG. 8, ditches 305 are formed nonlinearly.

Thus, when ditches as ditch-shaped structures are formed on the first surface of the holding sealer, its shape is not limited. Also, when ditches as ditch-shaped structures are formed on the first surface of the holding sealer, its elongated direction is not limited but the direction may be a substantial parallel direction (x direction) to the winding direction of the holding sealer, a substantial perpendicular direction (y direction), a diagonal direction or any combination of these plural direction. Especially, it is preferred that ditch-shaped structures be constructed by ditches arranged in parallel along two different directions (for example, directions mutually perpendicular), as shown in below examples.

Also, the pitch of the ditch is not limited, but it can be set freely depending on the isostatic strength of the exhaust gas processing body. However, in the case ditch-shaped structures are constructed as notches, if the number of notches is too small (for example, the pitch of the notch is less than about 0.2/1 cm), there is a possibility that a stress dispersion function of the holding sealer will not be performed enough. On the other hand, if the number of notches is too large (for example, the pitch of the notch is greater than about 10/1 cm), a held surface pressure should not be lower than the appropriate lowest limit of the surface pressure which is described above. Especially, the pitch of the notch is preferably about 0.5-about 5/1 cm. Also, it is not necessary for the ditches to be formed at equal intervals, but ditches may be constructed at unequal intervals.

In the example shown in FIG. 1, plural notches along the substantially perpendicular direction (the Y direction) to the winding direction are arranged at about 6.2 mm intervals on the first surface 80 of the holding sealer 24 in order to form ditch-shaped structures 300. These notches have an equal length corresponding to the full length of the Y direction of the holding sealer 24, a width which is about 1 mm or below and a depth which is about ½ of the thickness of the holding sealer 24. Also, it is preferable that the depth of the ditch be about ½ of the thickness of the holding sealer 24, as shown in the above example. If the ditch is too deep, the holding sealer might become cracked starting from the ditch at the time of handling. Also, if the ditch is too shallow, the stress dispersion function of the holding sealer might be not performed enough. However, the depth of the ditch is relative to the number of the ditches (and pitch). If the number of ditches is too many, the depth of the ditches may be less than about ½ of the thickness of the holding sealer 24.

As described above, an important thing to achieve the effects of the present embodiment is that ditch-shaped structures 300 be provided on the holding sealer in order to form three-dimensional spaces which do not exist in the holding sealer on parts on the first surface (the outer surface) of the holding sealer when the holding sealer is wound around the outer surface of an object such as the exhaust gas processing body and the like. If such three-dimensional spaces are formed, ditch-shaped structures 300 may be any embodied.

Figure 9:
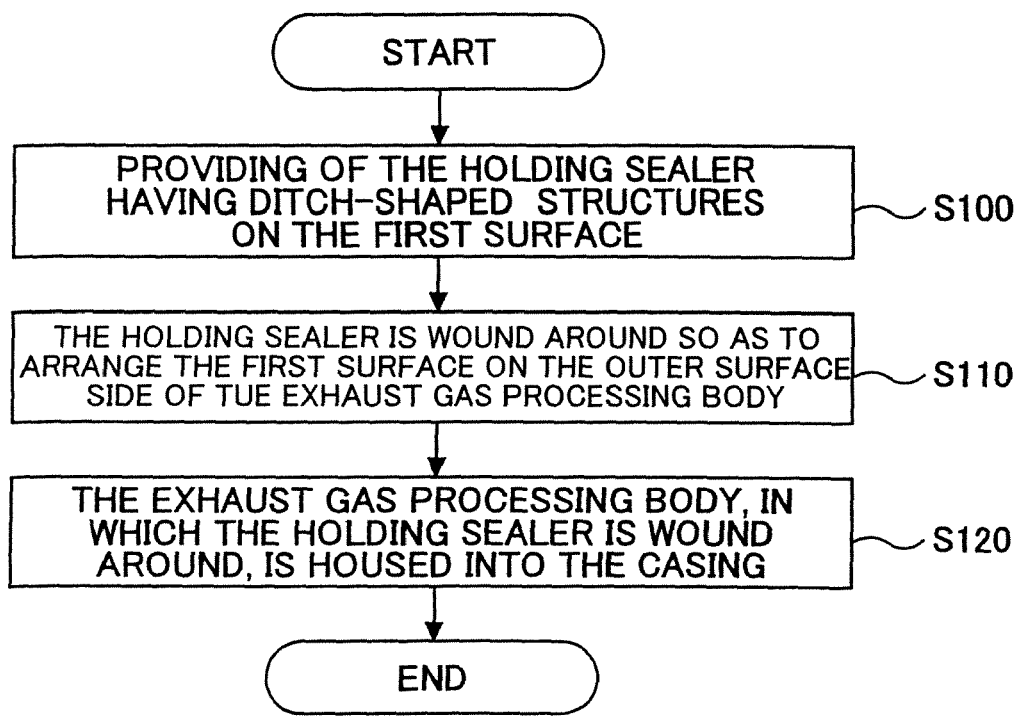
FIG. 9 is a manufacturing flowchart of the exhaust gas processing device according to an embodiment of the present invention.

By using the holding sealer 24 having such ditch-shaped structures 300, the exhaust gas processing device 10 is constructed as follows. In FIG. 9, a manufacturing flow of the exhaust gas processing device 10 is schematically illustrated.

First of all, in step S100, the holding sealer 24 having ditch-shaped structures 300 on the first surface 80 is provided. Next, in step S110, the holding sealer 24 is wound around on the outer surface of the exhaust gas processing body 20 and the holding sealer 24 is unified as one with the exhaust gas processing body 20 by fitting ends of the holding sealer 24 together and fixing them. In this case, the holding sealer 24 is wound around the exhaust gas processing body 20 so as to arrange the first surface 80 on the outer surface side. Next, in step S120 step, the exhaust gas processing body 20, about which the holding sealer 24 is wound around, (herein below, it is called "the coated exhaust gas processing body" 210) is placed into the casing 12 by any one of wearing methods of the press-fit means, the clamshell means, the winding and tightening means or the sizing means. Thereby, the exhaust gas processing device 10 is constructed.

Each wearing method is explained below reference with drawings. FIGS. 10, 11, 12 and 13 are schematic view of respective wearing methods in which the coated exhaust gas processing body 210 is placed into the casing by the press-fit means, the clamshell means, the winding and tightening means or the sizing means, respectively.

Figure 10:
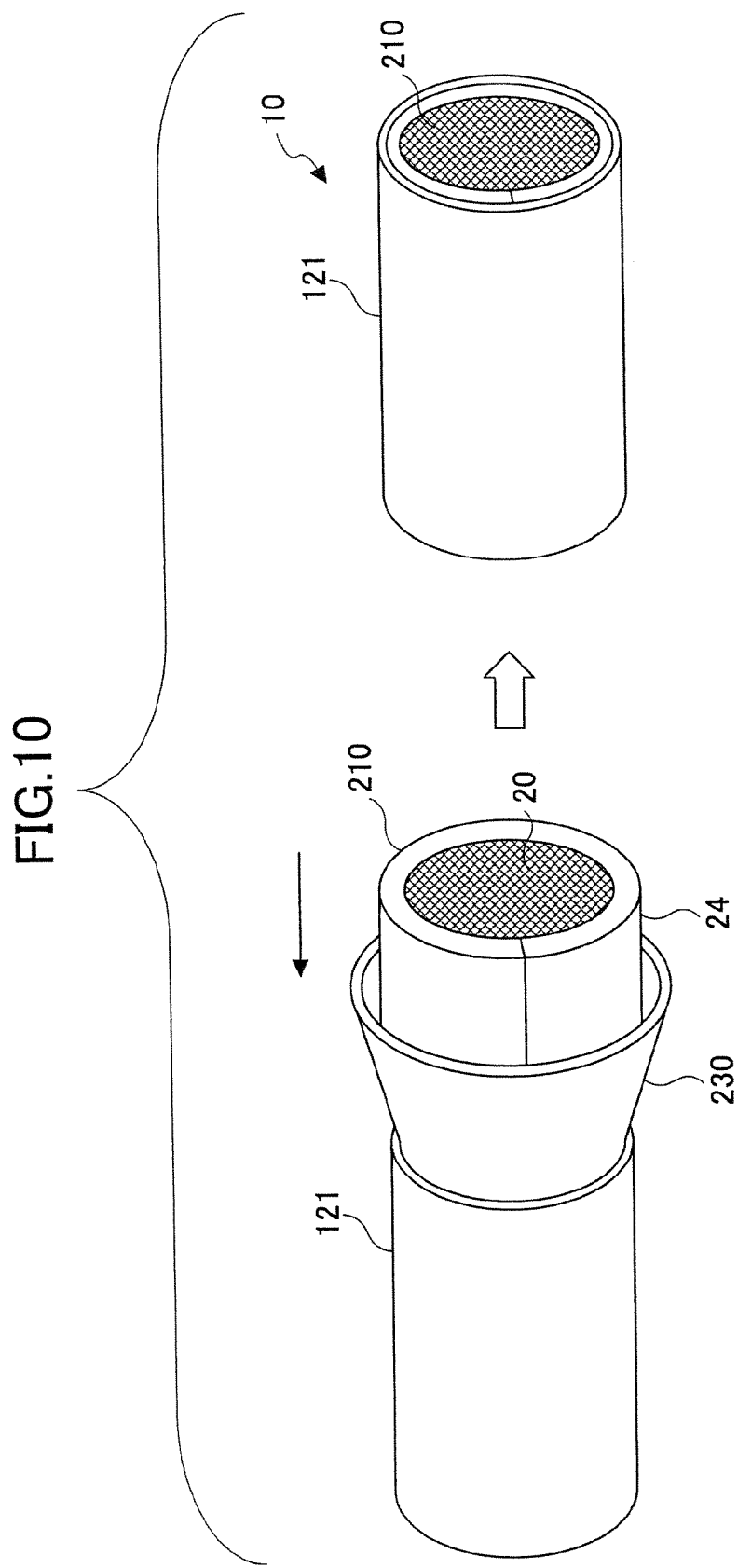
FIG. 10 is a schematic view showing a method of placing a coated exhaust gas processing body into the casing by the press-fit means.

The press-fit means is a method of constructing the exhaust gas processing device 10 to place the coated exhaust gas processing body 210 at the predetermined position by pushing the coated exhaust gas processing body 210 into the casing 121 from one of the opening sides of the casing 121. In order to facilitate the insertion into the casing 121 of the coated exhaust gas processing body 210, as shown in FIG. 10, there is a case that a press-fit tool 230, in which the inner diameter is gradually decreased from one end to the other end and the minimum inner diameter is adjusted to be almost the same as the inner diameter of the casing 121, may be used. In this case, the coated exhaust gas processing body 210 is inserted from a wide inner diameter side of the press-fit tool, and placed into the casing 121 through the minimum inner diameter side.

Figure 11:
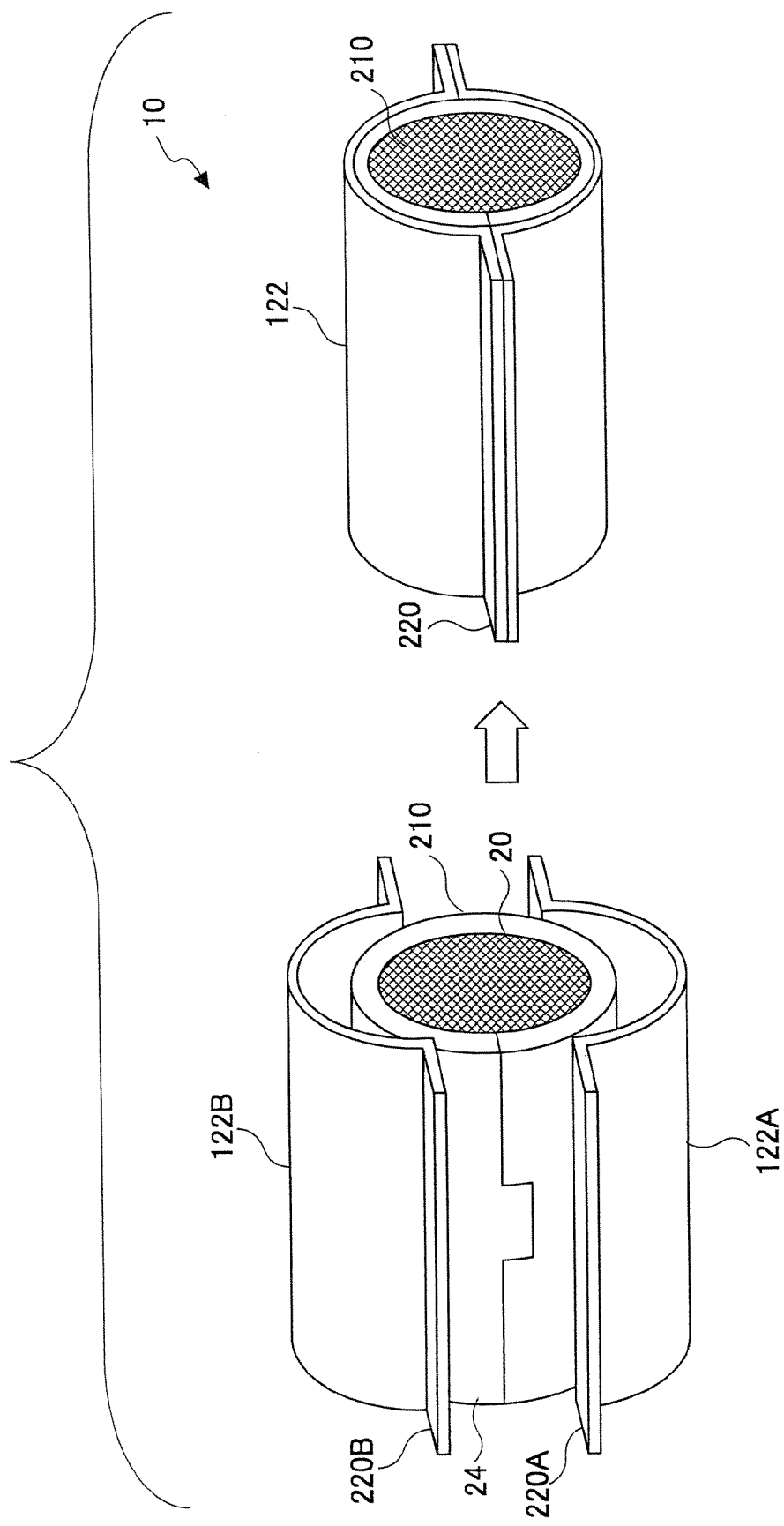
FIG. 11 is a schematic view showing a method of placing a coated exhaust gas processing body into the casing by the clamshell means.

In the clamshell means, as shown in FIG. 11, casing member (122A, 122B), which is divided (for example, divided into two parts in example of FIG. 11) so that a pair of casings formed when facing each other mutually, is used. After the coated exhaust gas processing body 210 is placed in one of the casing members, the rest of the casing members are combined, then a casing 122 is formed such that these members are welded at flange part 220 (220A, 220B) for example, so that a gas processing device 10 in which the coated exhaust gas processing body 210 is placed at a predetermined position can be obtained.

Figure 12:
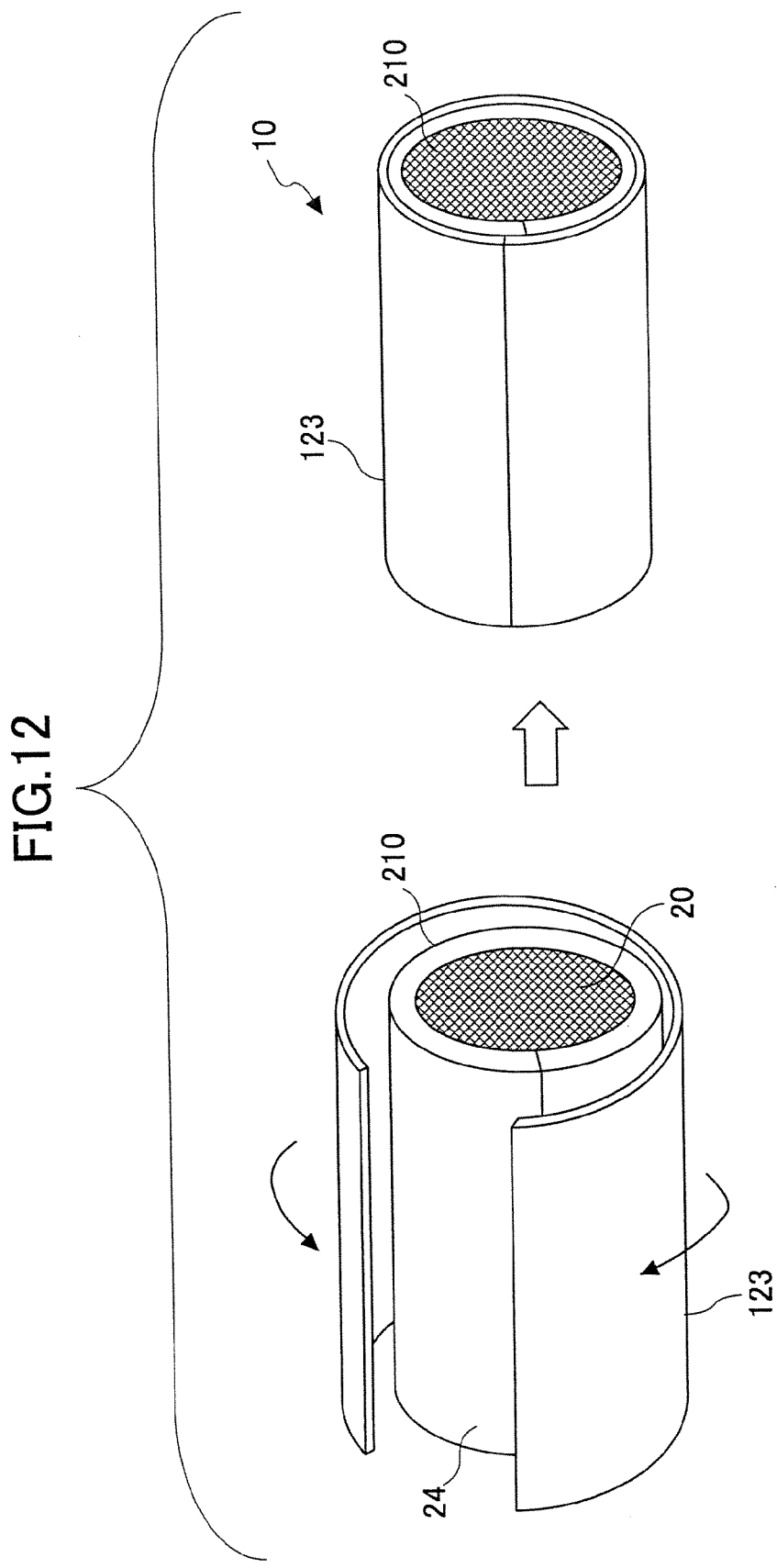
FIG. 12 is a schematic view showing a method of placing a coated exhaust gas processing body into the casing by the winding and tightening means.

As shown in FIG. 12, the winding and tightening means is such that after a metal plate 123 as a casing member is wound around the coated exhaust gas processing body 210, the metal plate is tightened up with wire ropes and the like, the metal plate 123 put is directly in contact on the coated exhaust gas processing body 210 circumferentially with a predetermined surface pressure. Finally, one end of the metal plate 123 is welded to the other end or a surface of the lower metal plate 123, thereby a gas processing device 10 in which the coated exhaust gas processing body 210 is placed inside of the casing 123 can be obtained.

Figure 13:
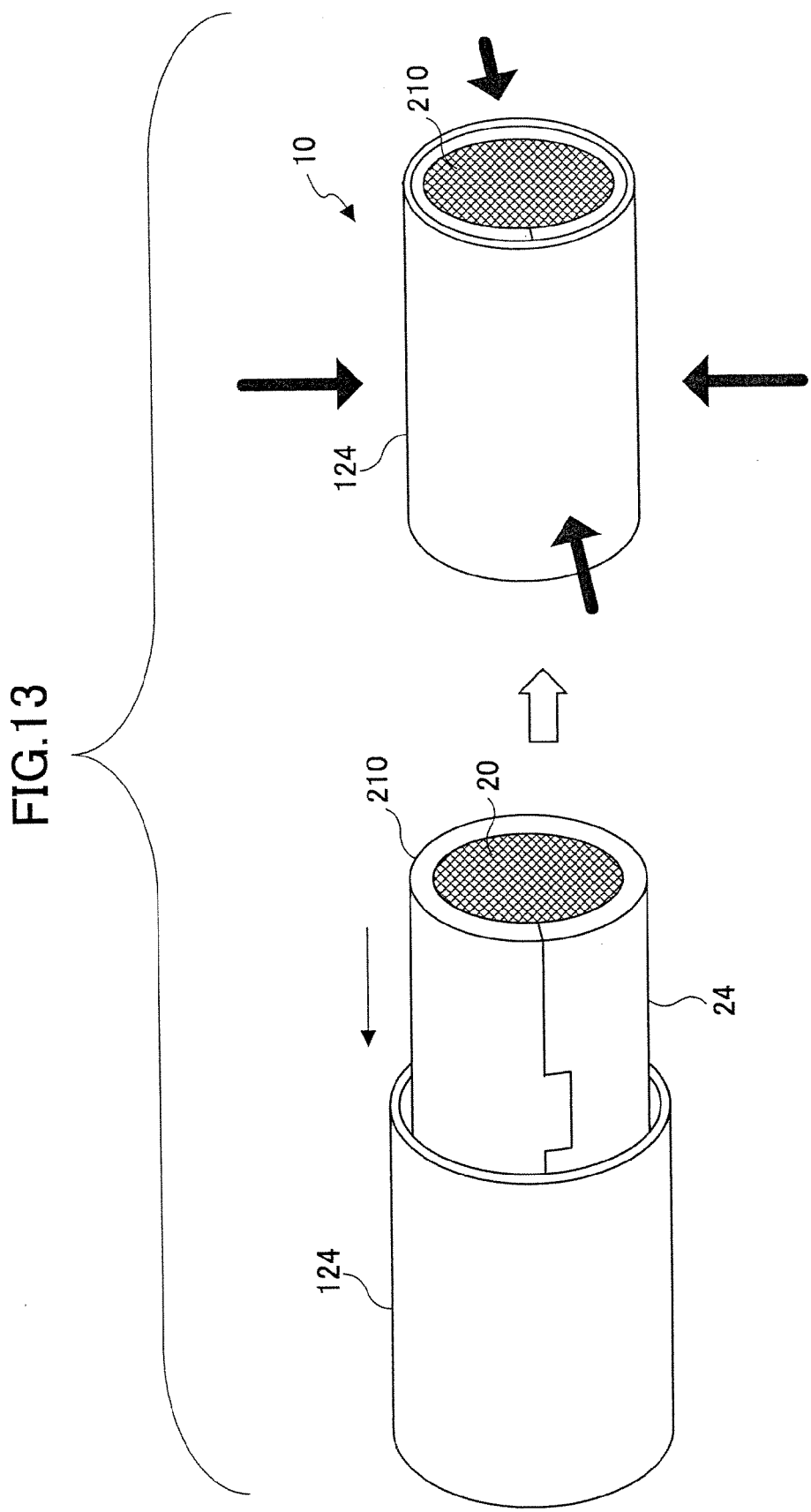
FIG. 13 is a schematic view showing a method of placing a coated exhaust gas processing body into the casing by the sizing means.

Moreover, as shown in FIG. 13, the sizing means is such that after the coated exhaust gas processing body 210 is inserted into a metal shell 124 having an inner diameter which is larger than the outer diameter of the coated exhaust gas processing body 210, the metal shell 124 is evenly compressed (sized (JIS-z2500-4002)) from the outer circumference side by a press machine and the like. The inner diameter of the metal shell 124 is adjusted correctly in a desired dimension by the sizing process, and the coated exhaust gas processing body 210 can be placed at the predetermined position. In the sizing means, since a compression stress is greatly applied to the exhaust gas processing body 20 momentarily during the handling, there is a high probability of the occurrence of damage for an exhaust gas processing body 20 having low isostatic strength, especially. However, if the holding sealer according to the present invention is used, the breakage of the exhaust gas processing body 20 is prevented by the stress dispersion effect of the above holding sealer even though the exhaust gas processing body 20 is stressed with the sizing means.

Also, metals such as heat-resistant alloys can be used for materials of the casing used in these methods.

Figure 14:
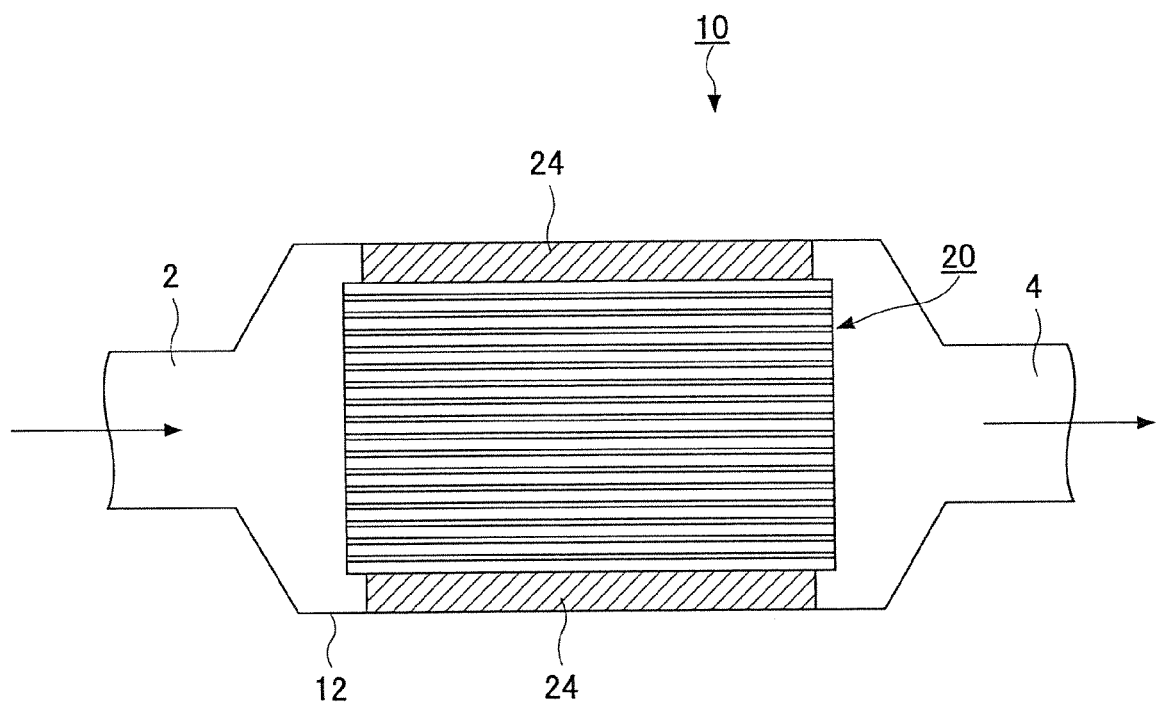
FIG. 14 is a view showing one structural example of the exhaust gas processing device of an embodiment of the present invention.

One structural example of the exhaust gas processing device 10 which is constructed in such a way is shown in FIG. 14. In the example of FIG. 14, the exhaust gas processing body 20 is a catalyst carrier having many through-holes in a parallel direction of the gas flow. For example, the catalyst carrier is composed of honeycomb-shaped porous silundum and the like. Also, the exhaust gas processing device 10 of the present embodiment is not limited to such a structure. For example, the exhaust gas processing body 20 can be DPF, in which ends of through-holes are sealed in a checkered design. In such an exhaust gas processing device, the breakage of the exhaust gas processing body 20 can be avoided due to the effect of the above holding sealer 24 in the case where the exhaust gas processing body 20 is incorporated into the casing or in the case where the compression stress is applied onto the holding sealer at the time of use of the device.

One example of manufacturing method of the holding sealer of the present invention is explained below.

The holding sealer of the present invention is manufactured as follows. First, a precursor comprising inorganic fibers is manufactured. In the below description, a mixture of alumina and silica as inorganic fibers can be used, but inorganic fibers are not limited to the above mixture. For example, either only alumina or silica may be used for its structure of inorganic fiber. In one example, silica sol is added to basic aluminum chloride solution (70 g/l of aluminum, Al:Cl=1.8 (atomic ratio)) so as to about 60-80:about 40-20 of alumina:silica ratio, thereby the precursor of inorganic fibers is prepared. If alumina ratio is about 60% or above, an existence ratio of mullite produced from alumina and silica does not become low, thereby thermal conductivity of the holding sealer does not increase and enough heat insulation can be achieved. Especially, it is preferable that the alumina:silica ratio be about 70-74:about 30-26.

Next, organic polymers such as polyvinyl alcohols are added to the precursor of alumina fibers. Then, this liquid is condensed and a spinning solution is prepared. Also, the spinning is processed with a blowing method by using the spinning solution.

The blowing method is for spinning by using an air flow blowing from an air nozzle and a flow of the spinning solution pushed out from a supply nozzle of the spinning solution. Gas speed per slit from the air nozzle is usually about 40-200 m/s. Also, diameter of a spinning nozzle is usually about 0.1-0.5 mm. The amount of solution per one supply nozzle of the spinning solution is usually about 1-120 ml/h, but about 3-50 ml/h is preferable. In such a condition, the spinning solution pushed out from a supply nozzle of the spinning solution does not become a form of spray (form of fog) but spreads enough, and it is hard to be welded between fibers. Because of this, even precursor of alumina fiber in which the distribution of diameters of fiber is narrow can be obtained by optimizing the spinning condition.

A laminated sheet is manufactured by laminating the precursor for which spinning is completed. Also, the needling process is performed on the laminated sheet using the needling machine. The needling process is such that many needles are stuck into the laminated sheet and pulled off from the laminated sheet, thereby allowing each layer more close contact and allowing the sheet to be thin. Generally, the needling machine is used for the needling process. The needling machine comprises a needle board movable back and forth along a stabbing direction of needles, and a support plate which is provided on both sides of the laminated sheet and fixes the laminated sheet. On the needle board, lots of needles for stabbing the laminated sheet are arranged perpendicular to the plane of the board containing about 100-5000 needles/100 $cm^2$, for example. Also, lots of through-holes for needles are provided on the support plate, thereby needles can pass though these through-holes and reach the laminated sheet. Using such a needling machine, by performing the needling process of sticking needles into the laminated sheet and pulling off needles from the laminated sheet, fibers which are intertwined with each other complicatedly are oriented along with the direction of the thickness and an anti-peeling characteristic for the direction of the thickness of the laminated sheet can be improved.

Next, the laminated sheet with the specific needling process is heated from ambient temperature, and the predetermined concentration of the holding sealer can be obtained by continuous firing around the hottest temperature, about 1250° C.

In order to make handling easily, the holding sealer which is obtained with the above process is cut to a predetermined size.

Next, organic binders like resin are impregnated in the holding sealer which is cut, as necessary. It is preferable that the content of organic binder be between about 1.0 and about 10.0 weight %. If the content is about 1.0 weight % or above, the secession of inorganic fiber can be prevented enough. Also, if the content is about 10.0 weight % or below, the holding sealer can be flexible and it is not difficult for the holding sealer after completion to be wound around the exhaust gas processing body.

Also, it is preferable to use acrylic resin (ACM), acrylnitryl-butadiene gum (NBR), and stylene-butadiene gum (SBR) as organic binders.

The resin is impregnated in the holding sealer by spray coating using aqueous dispersion prepared with the above organic binders and water. Also, any excess coated solid and water included in the holding sealer are removed in the next step.

In the next step, any excess solid is removed and a drying process is performed. Removing the excess solid is processed by vacuum aspiration. Also, removing the excess water is processed by a heat compression drying method. In this method, because a pressing pressure is applied to the holding sealer, the excess water can be removed and the holding sealer can be made thin. The drying process is performed around about 95-about 155° C. If the temperature is higher than about 95° C., the drying does not take time and production efficiency does not decrease. Also, if the drying temperature is higher than about 155° C., decomposition of organic binders themselves does not begin and adhesive performance due to organic binders is not lost.

Next, after the holding sealer which has predetermined shape is obtained by cutting, the holding sealer having the ditch-shaped structure on its surface can be manufactured by forming desired notch lines on at least one surface of the holding sealer with a cutter and the like. Alternatively, the ditch-shaped structure may be formed on at least one surface of the holding sealer after completion by performing a pressing process of a template providing the predetermined ditches.

Also, the holding sealer of the present invention can be manufactured by a paper scooping method other than the above needling method. The papermaking method is also called usual wet processing, and it is a processing method for manufacturing the holding sealer through each process of mixing of fibers, stirring, opening of fibers, slurrying, paper molding and compression drying as in papermaking. Below, the manufacturing method of the holding sealer of the present invention is explained.

First, predetermined quantities of inorganic fiber raw materials, inorganic binders and organic binders are mixed in water. Original cotton bulk of mixed fibers of alumina and silica as inorganic fiber raw materials can be used, for example. However, inorganic fiber raw materials are not limited to the above materials; for example, inorganic fiber raw materials may be composed of only alumina and silica. Alumina sol and silica sol and the like are used as inorganic binders, for example. Also, latex and the like are used as organic binders.

Next, the obtained mixture is stirred in a mixer like a papermaker, and open fiber slurry is prepared. Usually, the stirring and opening fiber process is performed for about 20-about 120 seconds. Then, the obtained slurry is molded in a desired shape in a molding machine, and a material mat of the holding sealer is obtained by further dehydration. Here, for example, by molding the slurry with a molding machine in which desired shaped ditches are formed in its bottom, the material mat having plural ditches (or one ditch) on any one surface (or both surfaces of frond and back) can be manufactured.

Further, this material mat is compressed with a pressing machine and the like, then heated and dried at a predetermined temperature. Thereby the holding sealant of the present invention can be obtained. The compression process is performed such that the density of the holding sealer after finishing of usual compression becomes about 0.10 g/cm$^3$-about 0.40 g/cm$^3$. The heating and drying process is performed at about 90-about 150° C. for about 5-about 60 minutes such that the material mat is placed inside a heating processing machine like an oven.

The holding sealer which is manufactured as above is cut for easy handling, and is further used for cutting in a predetermined final shape. Also, before or after cutting, further processing may be performed using the obtained holding sealer.

As necessary, the organic binder such as resin is impregnated into the holding sealer which has been cut. Thereby, bulkiness of the holding sealer can be controlled and an assembling ability when the holding sealer is wound around the exhaust gas processing body within the exhaust gas processing device is improved. In addition, when a hot exhaust gas is introduced into the exhaust gas processing device, organic binders in the holding sealer are lost. Thereby, the compressed holding sealer is restored and retention of the holding sealer is improved.

It is preferable that the amount of organic binder be between about 1.0 and about 10.0 weight %. If the amount of organic binder is about 1.0 weight % or above, an improved effect of the ability of assembling is sufficient. Also, if the amount of organic binder is about 10.0 weight % or below, the flexibility of the holding sealer is provided and it is not hard to wind the holding sealer around the exhaust gas processing body.

Also, it is preferable to use acrylic resin (ACM), acrylnitryl-butadiene gum (NBR), and stylene-butadiene gum (SBR) as organic binders.

The resin is impregnated in the holding sealer by spray coating using aqueous dispersion prepared with the above organic binders and water. Also, any excess coated solid and water included in the holding sealer are removed in the next step.

In the next step, any excess solid is removed and a drying process is performed. Removing of the excess solid is processed by vacuum aspiration. Also, removing of the excess water is processed by the heat compression drying method. In this method, because a pressing pressure is applied to the holding sealer, the excess water can be removed and the holding sealer can be made thin. The drying process is performed around about 95-about 155° C. If the temperature is higher than about 95° C., the drying time does not take time and production efficiency does not decrease. Also, if the drying temperature is about 155° C. or below, decomposition of organic binders themselves begins to start and adhesive performance due to organic binders is not lost.

The holding sealer which is manufactured by the above needling process, papermaking, or other method is wound around the outer surface of the exhaust gas processing body so as to place the first surface having ditch-shaped structures on the outer surface. After that, the exhaust gas processing body wound by the holding sealer is placed into the casing using any one of the above wearing methods and thereby the exhaust gas processing device 10 is constructed. Since the exhaust gas processing device is constructed by the holding sealer having ditch-shaped structures according to the embodiment of the present invention, the breakage of the exhaust gas processing body due to the compression stress from the holding sealer hardly occurs even though the exhaust gas processing body having thin cell walls (for example, thickness is between about 0.03 mm and about 0.10 mm) is used. Thus, the exhaust gas processing device in which the good retention of the holding sealer against the exhaust gas processing body is maintained and the breakage of the exhaust gas processing body hardly occurs can be obtained.

Below, effects of the present invention are explained using examples.

EXAMPLES

In order to verify effects of the present invention, each kind of examination was performed using the holding sealer of the present invention. The holding sealer was manufactured by the following procedures with the needling process.

Manufacturing of the Holding Sealer

The silica sol was blended to basic aluminum chloride solution (aluminum content: 70 g/l, Al/Cl=1.8(atomic ratio)) so as to be $Al_2O_3:SiO_2=72:28$ in composition of alumina fibers, then the precursors of alumina fibers were formed.

Then, organic copolymers like polyvinyl alcohol were added to the precursor of alumina fibers. Also, the solution was condensed to be as the spinning solution, and the spinning was performed with the blowing method using the spinning solution.

Then, folded structures of the precursor of alumina fibers were laminated, and the laminated sheet of alumina fibers was manufactured. The needling process was performed on the laminated sheet using the needle board having needles of 500/100 $cm^2$.

Then, the obtained sheet member was continuously fired from the ambient temperature to the hottest temperature 1250° C., then the holding sealer of alumina fibers having 1400 $g/cm^2$ of concentration is obtained. The average fiber diameter of alumina fibers was 5.0 μm and minimum diameter was 3.2 μm. Also, the thickness of the holding sealer was 9 mm.

Also, the average diameter of fibers is measured by the following method. First, alumina fibers were put into a cylinder, a pressure crushing process was applied at 20.6 Mpa. Then, these samples were put on a filter net, and samples which passed through the filter net were assumed as an examination body for electron microscopic observation. After gold is evaporated on a surface of the examination body, electron microscopic pictures (almost 1500×) were taken. The diameter of fibers is measured for at least 40 fibers based on the obtained pictures. This step is repeated for 5 samples and average measured value was the average diameter of fibers.

Figure 15:
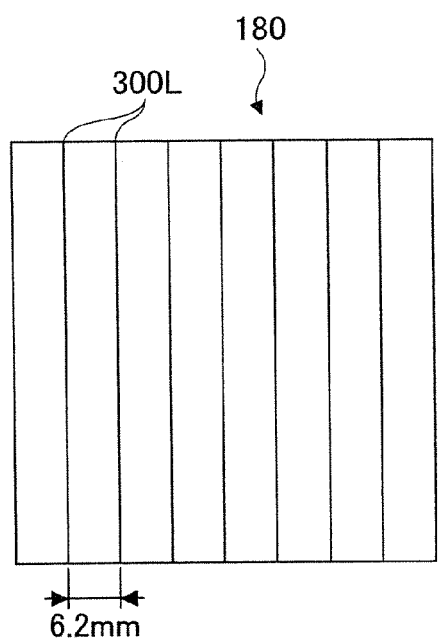
FIG. 15 is a view showing an arrangement of notch lines of a sample of the holding sealer for evaluation examination.

The holding sealer manufactured based on the above step was cut into a size of 50 mm×50 mm. In addition, 7 notch lines 300L were formed using a cutter having a blade with 1 mm thickness so as to form ditch-shaped structures 300 on one side of the holding sealer. Notch lines 300L were placed at equal distance (line pitch is 6.2 mm) so as to be parallel substantially to one length of the holding sealer (see FIG. 15). Each length of all notch lines 300L is 50 mm and the maximum depth of each notch line 300L was about 4 mm. A holding sealer which is obtained by the above process was set as example 1.

Figure 16:
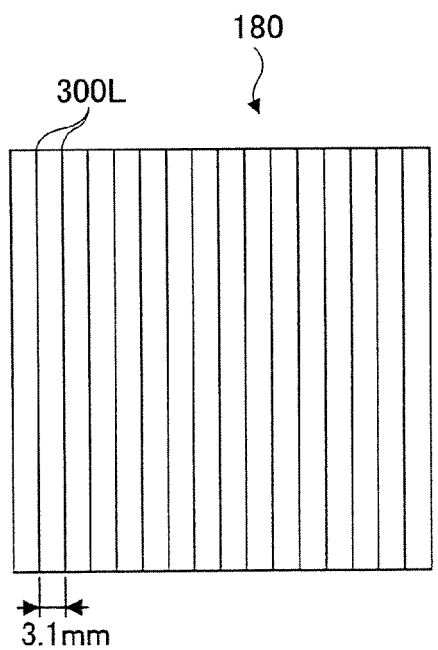
FIG. 16 is a view showing an arrangement of other notch lines of a sample of the holding sealer for evaluation examination.
Figure 17:
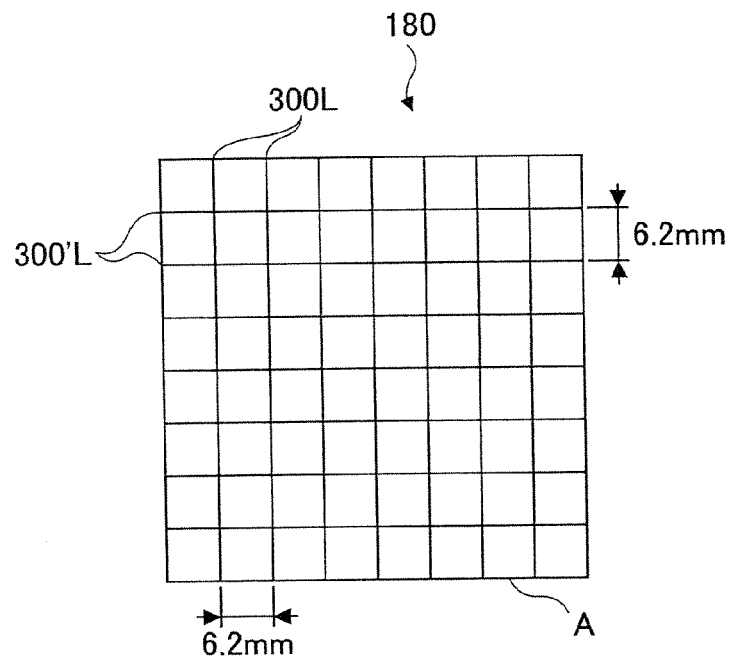
FIG. 17 is a view showing an arrangement of further other notch lines of a sample of the holding sealer for evaluation examination.
Figure 18:
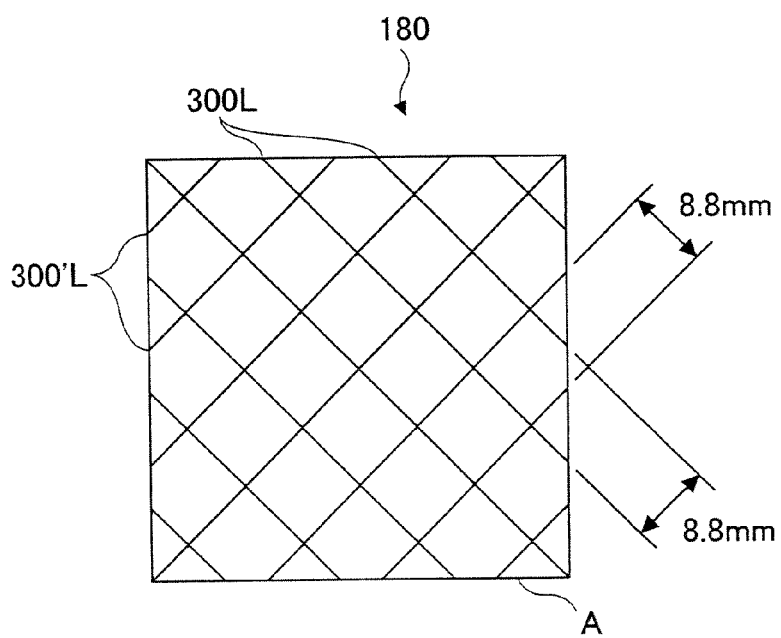
FIG. 18 is a view showing an arrangement of further other notch lines of a sample of the holding sealer for evaluation examination.

Next, a holding sealer sample was manufactured in the same method of example 1 except having 15 lines of notch lines. Pitch of the line was 3.1 mm. This sample was set as example 2 (see FIG. 16). Also, a holding sealer sample of example 3 was manufactured in the same method of example 1 except forming a substantial perpendicular 7 notch lines 300L' in equal distance (line pitch is 6.2 mm) to 7 notch lines 300L in equal distance (line pitch is 6.2 mm) as the same in example 1 (see FIG. 17). Also, a holding sealer sample of example 4 was manufactured in the same method of example 1 except forming a substantial perpendicular 7 notch lines 300L' in equal distance (line pitch is 8.8 mm) along a diagonal to 7 notch lines 300L in equal distance (line pitch is 8.8 mm) along a diagonal (see FIG. 18). Also, a holding sealer sample without having notch lines was manufactured in the same method of example 1. This sample was set as a comparative example.

Examinations for Evaluating Surface Pressure

Figure 19:
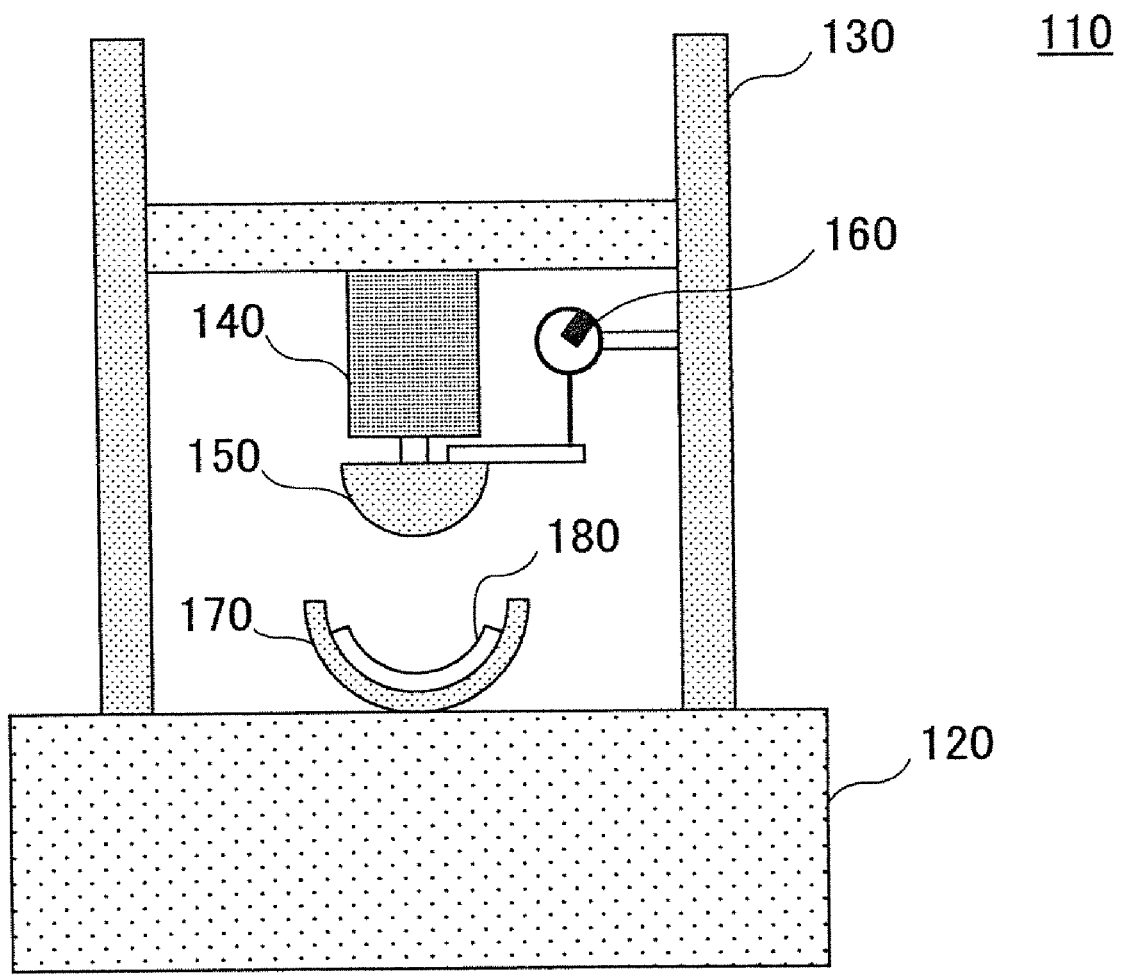
FIG. 19 is a schematic view showing a device for the examination of the surface pressure.

Next, examinations for evaluating surface pressure were performed using each sample manufactured in the above method. A device 110 which is used for examinations for evaluating surface pressure is shown in FIG. 19. The device 110 comprises a gate-shaped prop 130 provided on a sample holding stand 120 which is almost horizontal. A crosshead 140 which is moved up and down and has a load measurement function is provided at the center (an upper part of the sample holding stand 120) of the device 110. A semicylinder-shaped upper part disk plate 150 made of stainless steel with almost 103 mm diameter is provided on a bottom side of the crosshead 140. A displacement meter 160 is provided on the upper part of disk plate 150. A semicylinder-shaped bottom part disk plate 170 made of stainless steel with almost 111 mm diameter is provided on the sample holding stand 120. A semicylinder-shaped inner part of the bottom part disk plate 170 is dug out so that the inner surface of the bottom part disk plate 170 matches the outer shape of the upper part disk plate 150, and they are placed such that the inner surface of the bottom part disk plate 170 faces the upper part disk plate 150. During examinations, each holding sealer sample 180 whose weight is known is placed on the inner surface of the bottom part disk plate 170. The sample 180 is placed on the bottom part disk plate 170 such that the surface having notch lines faces downward. Here, the sample 180 of example 1 or 2 is placed such that the direction of notch lines 300L is substantially parallel to an axis direction of the cylinder of the upper part disk plate 150 (or the bottom part disk plate 170). Such placement of samples corresponds to a case that notch lines are provided so as to elongate along a direction which is substantially parallel to an inflow direction of the exhaust gas. However, concerning samples of examples 3 and 4, the sample is placed such that the length A of the sample is substantially perpendicular to the axis direction of the cylinder of the upper part disk plate 150 (or the bottom part disk plate 170) at the time of placing the sample.

The surface pressure measurement was performed using such device 110 in the below method. First, the crosshead 140 is moved down to a level so that a gap does not appear to be produced between the sample 180 and the upper part disk plate 150 beforehand. In this state, the crosshead 140 is moved down at the speed of 1 mm/minute, the sample 180 is compressed, and a load (force) produced on the sample 180 is measured when a bulk density (herein below, it is called GBD) of the sample 180 becomes a predetermined value (0.35-0.50 $g/cm^3$). Also, the bulk density of the sample 180 can be measured from the weight of the sample 180/an area of the sample 180/an interval between the upper part disk plate 150 and the bottom part disk plate 170. The obtained load is divided by the area of the sample, and thereby the surface pressure (kPa) is obtained.

Examinations for Evaluating the Restoration Surface Pressure

Next, examinations for evaluating the restoration surface pressure were performed using each sample of holding sealer manufactured in the above method. The examination for evaluating restoration surface pressure measurement was performed using such device 110 in the below method.

First, the crosshead 140 is moved down to a level so that a gap does not appear to be produced between the sample 180 and the upper part disk plate 150 beforehand. In this state, the crosshead 140 is moved down at the speed of 1 mm/minute, and the sample 180 is compressed. The compression is terminated when a displacement of the sample becomes 4 mm, then the crosshead 140 is moved in the opposite direction (moved up) only by 0.36 mm and the sample is restored. Such kind of compression and restoration were performed repeatedly 10 times, load when the sample was finally restored to the original state was measured. The obtained load is divided by the area of the sample, and thereby the restoration surface pressure (kPa) is obtained.

Examination Result

Figure 20:
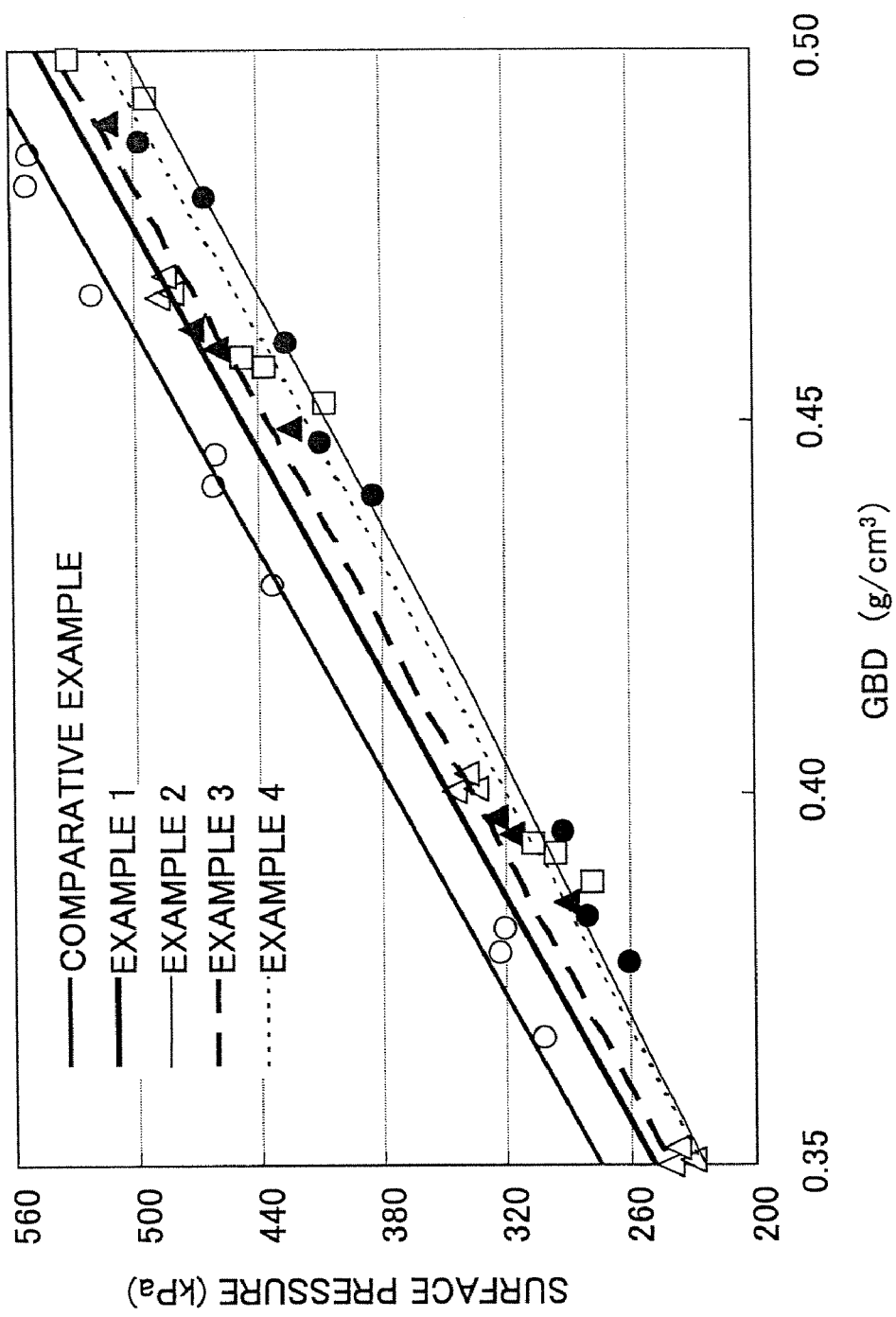
FIG. 20 is a graph showing results of examinations of the surface pressure.

The examination result of the surface pressure obtained from each holding sealer is shown in FIG. 20, and the examination result of the restoration surface pressure is shown in FIG. 21. The horizontal axis of FIG. 20 is GBD of the holding sealer and the vertical axis of FIG. 20 is surface pressure which was measured. According to the above effect, it is recognized that the surface pressure is restricted for the holding sealer (examples 1-4) providing notch lines as ditch-shaped structures, compared to the holding sealer (comparative example) without providing notch lines. In addition, it is recognized that the tendency of decreasing the surface pressure is considerably remarkable for the holding sealer (example 2) providing 14 parallel notch lines as ditch-shaped structures, compared to the holding sealer (example 1) providing 7 parallel notch lines. Moreover, the surface pressure is decreased for the holding sealer (example 3) providing total 14 notch lines as ditch-shaped structures in which lines are set up at vertical and horizontal perpendicular directions compared to the sample and the holding sealer (example 4) providing total 14 notch lines as ditch-shaped structures in which lines are set up in perpendicular diagonal directions compared to the sample, compared to the holding sealer of example 1.

Based on these results, from the viewpoint of the surface pressure restraint, it is recognized that it is an advantage to provide as many as possible ditch-shaped structures on the holding sealer. In order to introduce such ditch-shaped structures into the holding sealer effectively, it is an advantage to provide ditches like notch lines in two or more directions without being limited to one direction. Also, the surface pressure of the holding sealer of example 4 is decreased compared to that of example 3. Therefore, in the case of introducing ditches along plural directions, it is preferable that directions of these ditches are defined to form wider three-dimensional space when the holding sealer is wound around the exhaust gas processing body.

Also, in FIG. 21, the restoration surface pressure of example 1 for the holding sealer providing 7 parallel notch lines as ditch-shaped structures or example 2 for the holding sealer providing 15 parallel notch lines as ditch-shaped structures is same as that of the comparative example for the holding sealer without providing notch lines. Based on this result, it is recognized that the retention of the holding sealer is not decreased substantially even when forming ditch-shaped structures on the first surface of the holding sealer.

INDUSTRIAL APPLICABILITY

The holding sealer and the exhaust gas processing device according to the embodiment of the present invention are applicable to the exhaust gas processing units and the like for vehicles.

The present invention is not limited to the specifically disclosed embodiment, and variations and modifications may be made without departing from the scope of the present invention.

The present application is based on Japanese priority application No. 2006-168065 filed on Jun. 16, 2006, the entire contents of which and JP-A-2000-204938 are incorporated herein by references.

What is claimed is:

1. A holding sealer for winding around an exhaust gas processing body of an exhaust gas processing device, said holding sealer comprising:
   a holding sealer material including mutually intertwined inorganic fibers, said holding sealer material having a first surface and a second surface opposing the first surface, and having a predetermined shape with a length edge extending in a winding direction and a width edge extending from the length edge;
   a plurality of needling traces where said mutually intertwined inorganic fibers are oriented along a direction of thickness of the holding and sealer material due to a needling process;
   a first plurality of parallel ditch shaped structures formed on said first surface; and
   a second plurality of parallel ditch-shaped structures formed on said first surface in a direction substantially perpendicular to the first plurality of ditch shaped structures,
   wherein said first and second plurality of ditch-shaped structures are each constructed by slit lines which extend in a diagonal direction relative to the length and width edges of the holding sealer material, each ditch shaped structure of the first plurality of parallel ditch-shaped structures is arranged such that the first plurality of parallel ditch-shaped structures has a pitch ranging from 0.5 to 5 per cm, and each ditch shaped structure of the second plurality of parallel ditch-shaped structures is arranged such that the second plurality of parallel ditch-shaped structures has a pitch ranging from 0.5 to 5 per cm so as to retain a stress dispersion capacity.

2. The holding sealer as claimed in claim 1, further comprising an inorganic binder or an organic binder, or both inorganic and organic binders.

3. An exhaust gas processing device comprising:
   an exhaust gas processing body,
   a holding sealer for winding around the exhaust gas body, the holding sealer comprising:
      a holding sealer material including mutually intertwined inorganic fibers, said holding sealer material having a first surface such that when the holding sealer material is wound around at least a portion of an outer surface of said exhaust gas processing body, said first surface faces outside;
      a plurality of needling traces where said mutually intertwined inorganic fibers are oriented along a direction of thickness of the holding and sealer material due to a needling process;
      a first plurality of parallel ditch shaped structures formed on said first surface;
      a second plurality of parallel ditch-shaped structures formed on said first surface in a direction substantially perpendicular to the first plurality of parallel ditch shaped structures, wherein said first and second plurality of parallel ditch-shaped structures are each constructed by slit lines which extend in a diagonal direction relative to a winding direction of the holding sealer material, each ditch shaped structure of the first plurality of parallel ditch-shaped structures is arranged such that the first plurality of parallel ditch-shaped structures has a pitch ranging from 0.5 to 5 per cm, and each ditch shaped structure of the second plurality of parallel ditch-shaped structures is arranged such that the second plurality of parallel ditch-shaped structures has a pitch ranging from 0.5 to 5 per cm so as to retain a stress dispersion capacity; and a casing which houses said exhaust gas processing body and said holding sealer material therein.

4. The exhaust gas processing device as claimed in claim 3, wherein said exhaust gas processing body is a catalyst carrier or an exhaust gas filter.

5. The exhaust gas processing device as claimed in claim 3, wherein said exhaust gas processing body, around which said holding sealer material is wound, is housed in said casing by any of a press-fit means, a clamshell means, a winding and tightening means or a sizing means.

6. A manufacturing method of an exhaust gas processing device, said manufacturing method comprising:

providing a holding sealer having mutually intertwined inorganic fibers, a plurality of needling traces where said mutually intertwined inorganic fibers are oriented along a direction of thickness of the holding and sealer material due to a needling process, a first plurality of parallel ditch-shaped structures on a first surface and a second plurality of parallel ditch-shaped structures formed on said first surface in a direction substantially perpendicular to the first plurality of ditch shaped structures, wherein said first and second plurality of ditch-shaped structures are each constructed by slit lines which extend in a diagonal direction relative to the length and width edges of the holding sealer material, each ditch shaped structure of the first plurality of parallel ditch-shaped structures is arranged such that the first plurality of parallel ditch-shaped structures has a pitch ranging from 0.5 to 5 per cm, and each ditch shaped structure of the second plurality of parallel ditch-shaped structures is arranged such that the second plurality of parallel ditch-shaped structures has a pitch ranging from 0.5 to 5 per cm so as to retain a stress dispersion capacity, winding said holding sealer around at least a portion of an outer surface of an exhaust gas processing body such that said first surface faces outside, and housing said exhaust gas processing body, around which said holding sealer is wound in said casing by any of a press-fit means, a clamshell means, a winding and tightening means or a sizing means.

7. A holding sealer for winding around an exhaust gas processing body of an exhaust gas processing device, said holding sealer comprising:

a holding sealer material including mutually intertwined inorganic fibers, said holding sealer material having a first surface and a second surface opposing the first surface, and having a predetermined shape with a length edge extending in a winding direction and a width edge extending from the length edge;

a plurality of needling traces where said mutually intertwined inorganic fibers are oriented along a direction of thickness of the holding sealer material due to a needling process; and a plurality of parallel ditch shaped structures formed on said first surface and constructed by slit lines having a pitch ranging from 0.5 to 5 per cm, each of said plurality of parallel ditch shaped structures extending in a width direction of the holding sealer material, and being in a zigzag shape.

8. The holding sealer of claim 1, wherein the pitch for each of the first and second plurality of ditches ranges from 0.5 to 3.22 per cm.

9. The holding sealer of claim 1, wherein the pitch for each of the first and second plurality of ditches ranges from 0.5 to 1.6 per cm.

10. The holding sealer of claim 1, wherein the pitch for each of the first and second plurality of ditches ranges from 1.6 to 3.22 per cm.

11. The holding sealer of claim 1, wherein the pitch for each of the first and second plurality of ditches ranges from 0.5 to 1.3 per cm.

12. The holding sealer of claim 1, wherein the pitch for each of the first and second plurality of ditches ranges from 1.3 to 3.22 per cm.

13. The holding sealer of claim 1, wherein the pitch for each of the first and second plurality of ditches ranges from 1.3 to 1.6 per cm.

14. The method of claim 6, wherein the pitch for each of the first and second plurality of ditches ranges from 0.5 to 3.22 per cm.

15. The method of claim 6, wherein the pitch for each of the first and second plurality of ditches ranges from 0.5 to 1.6 per cm.

16. The method of claim 6, wherein the pitch for each of the first and second plurality of ditches ranges from 1.6 to 3.22 per cm.

17. The method of claim 6, wherein the pitch for each of the first and second plurality of ditches ranges from 0.5 to 1.3 per cm.

18. The method of claim 6, wherein the pitch for each of the first and second plurality of ditches ranges from 1.3 to 3.22 per cm.

19. The method of claim 6, wherein the pitch for each of the first and second plurality of ditches ranges from 1.3 to 1.6 per cm.

* * * * *